(12) United States Patent
Ching

(10) Patent No.: US 9,994,097 B2
(45) Date of Patent: Jun. 12, 2018

(54) HAIL-RESISTANT VEHICLE COVER

(71) Applicant: Mallee Corp., New York, NY (US)

(72) Inventor: Ming Wai Ching, Yonkers, NY (US)

(73) Assignee: Mallee Corp., New York, NY (US)

( * ) Notice: Subject to any disclaimer, the term of this patent is extended or adjusted under 35 U.S.C. 154(b) by 0 days. days.

(21) Appl. No.: 15/299,222

(22) Filed: Oct. 20, 2016

(65) Prior Publication Data

US 2018/0111466 A1 Apr. 26, 2018

(51) Int. Cl.
*B60J 7/20* (2006.01)
*B60J 11/04* (2006.01)

(52) U.S. Cl.
CPC ..................... *B60J 11/04* (2013.01)

(58) Field of Classification Search
CPC .... B60J 11/00; B65D 5/48014; B65D 5/5415; E04H 15/18; A01G 13/0206; H05K 7/1497; H05K 7/20745; H05K 7/20836; H05K 7/20736; G06F 1/20
USPC .................................................... 296/136.02
See application file for complete search history.

(56) References Cited

U.S. PATENT DOCUMENTS

| | | | | |
|---|---|---|---|---|
| 4,418,954 A | * | 12/1983 | Buckley | B60J 7/141 296/100.09 |
| 4,432,581 A | * | 2/1984 | Guma | B60J 11/02 135/88.07 |
| 4,795,207 A | * | 1/1989 | Clarke | B60J 11/00 150/166 |
| 4,844,531 A | * | 7/1989 | Kooiker | B60J 7/041 296/100.09 |
| 4,848,828 A | * | 7/1989 | Hunt | B60P 7/04 150/154 |
| 4,889,171 A | * | 12/1989 | Minimo | B60J 11/00 150/166 |
| 4,951,993 A | * | 8/1990 | Taboada | B60J 11/00 150/166 |
| 5,012,760 A | * | 5/1991 | George, Jr. | B05B 15/0456 118/505 |
| 5,167,267 A | * | 12/1992 | McQuaid | B60J 11/00 150/154 |
| 5,193,877 A | * | 3/1993 | George, Jr. | B05B 15/0456 118/505 |
| 5,275,460 A | * | 1/1994 | Kraus | B60J 11/06 150/166 |
| 5,356,191 A | * | 10/1994 | Sheehan | B60J 11/08 150/168 |
| 5,413,396 A | * | 5/1995 | Poznansky | B60J 11/00 150/166 |
| 5,456,515 A | * | 10/1995 | Dang | B60J 11/025 150/166 |
| 5,570,735 A | * | 11/1996 | Chu | B60J 1/2091 160/135 |

(Continued)

*Primary Examiner* — Kiran B Patel

(74) *Attorney, Agent, or Firm* — Munck Wilson Mandala, LLP

(57) ABSTRACT

A hail-resistant cover for a vehicle is provided which may include a plurality of cover panels, each cover panel including a cover panel sleeve and an impact resistant cover panel insert. The cover panels may be affixed to each other by flexible cover panel joints which allow the cover panels to fold over onto the adjacent cover panels. The cover may also include anchors for anchoring the cover to the top of the vehicle. In some embodiments, the cover panels are removably affixed to the adjacent cover panels.

9 Claims, 17 Drawing Sheets

(56) References Cited

U.S. PATENT DOCUMENTS

| | | | | |
|---|---|---|---|---|
| 5,664,825 A * | 9/1997 | Henke | | B60J 11/00 150/166 |
| 5,800,006 A * | 9/1998 | Pettigrew | | B60J 11/00 150/166 |
| 5,890,525 A | 4/1999 | Shores | | |
| 6,017,079 A * | 1/2000 | Warner | | B60R 13/04 118/505 |
| 6,513,858 B1 | 2/2003 | Xingkang | | |
| 6,893,074 B1 | 5/2005 | Wilson | | |
| 7,100,965 B1 * | 9/2006 | Stover | | B60J 11/00 296/136.03 |
| 7,216,658 B1 * | 5/2007 | Navarro | | E04H 6/04 135/143 |
| 7,431,375 B1 * | 10/2008 | Julius | | B60J 11/06 150/168 |
| 8,146,984 B2 | 4/2012 | Devereaux | | |
| 8,419,107 B2 * | 4/2013 | Manchanda | | B60J 11/06 296/136.1 |
| 8,430,445 B1 * | 4/2013 | Williams | | B60J 11/08 150/168 |
| 8,910,997 B2 * | 12/2014 | Featherman | | B60J 11/04 150/166 |
| 9,156,339 B1 * | 10/2015 | Perez | | B60J 11/04 |
| 9,302,572 B2 | 4/2016 | Wang | | |
| 9,365,099 B1 * | 6/2016 | Ehrhart | | B60J 11/00 |
| 9,770,966 B1 * | 9/2017 | Gill | | B60J 11/04 |
| 9,889,732 B2 * | 2/2018 | Helb | | B60J 11/04 |
| 2002/0089207 A1 * | 7/2002 | Bayerle | | B60J 11/00 296/77.1 |
| 2004/0178657 A1 | 9/2004 | Tellez | | |
| 2007/0085372 A1 * | 4/2007 | Dhanray | | B60J 11/00 296/136.07 |
| 2007/0138829 A1 * | 6/2007 | Leyendecker | | B60J 11/00 296/136.02 |
| 2007/0284023 A1 | 12/2007 | Sitarz | | |
| 2009/0261614 A1 * | 10/2009 | Haas | | B60J 11/08 296/95.1 |
| 2010/0007169 A1 * | 1/2010 | Nguyen | | B60J 11/06 296/136.07 |
| 2011/0056634 A1 * | 3/2011 | Crozier | | B60J 11/08 160/370.21 |
| 2011/0095561 A1 * | 4/2011 | Li | | B60J 11/04 296/136.13 |
| 2016/0090029 A1 * | 3/2016 | Levytsky | | B60J 11/04 340/473 |
| 2018/0043761 A1 * | 2/2018 | May | | B60J 11/04 |

* cited by examiner

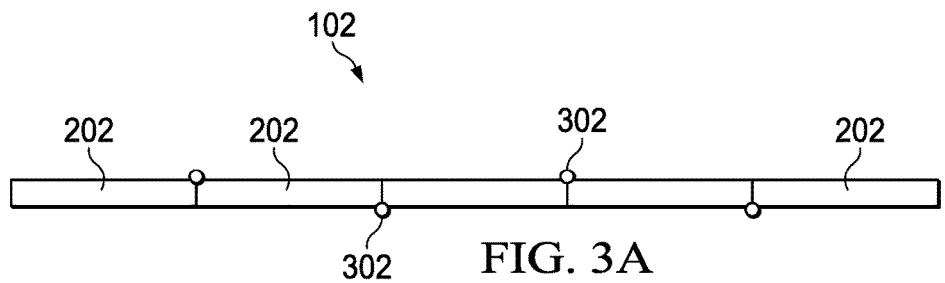
FIG. 3A
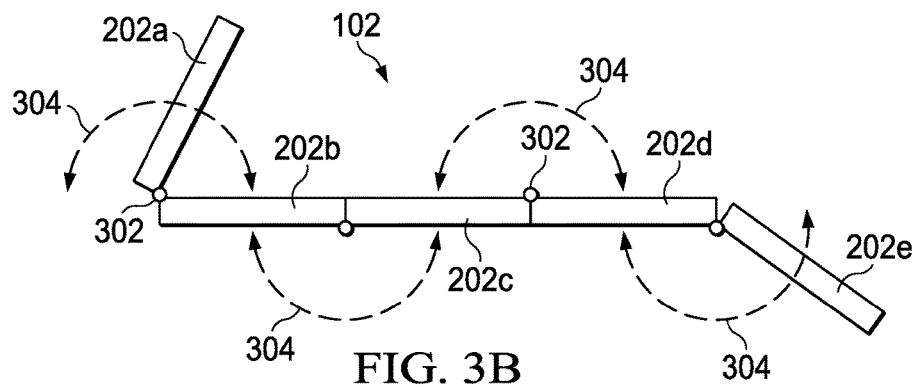
FIG. 3B
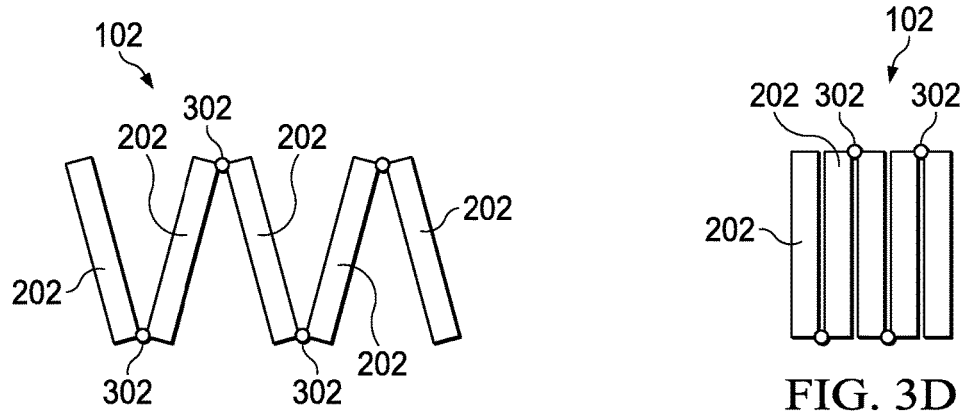
FIG. 3C
FIG. 3D

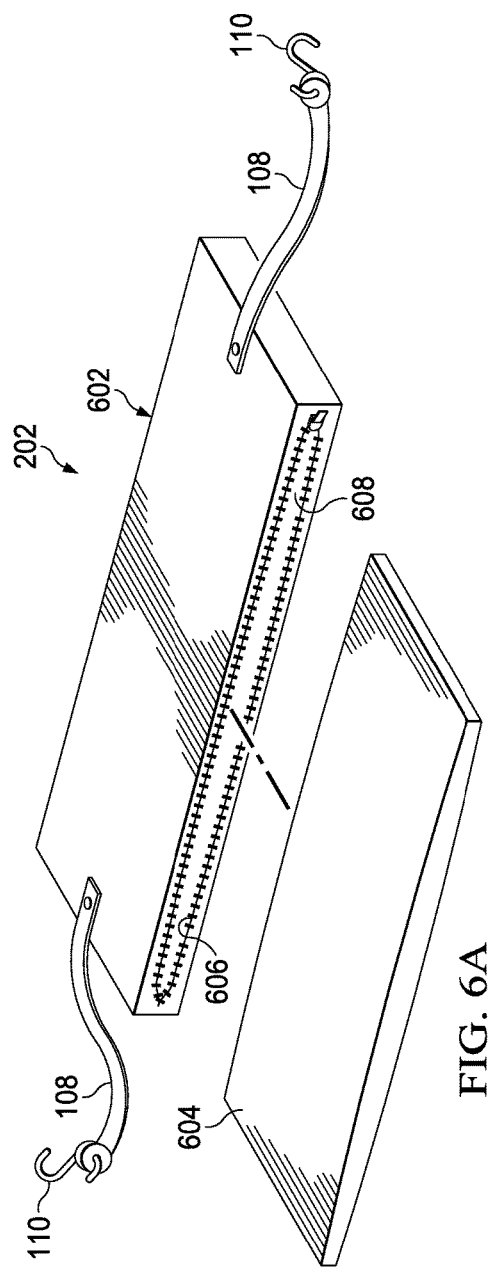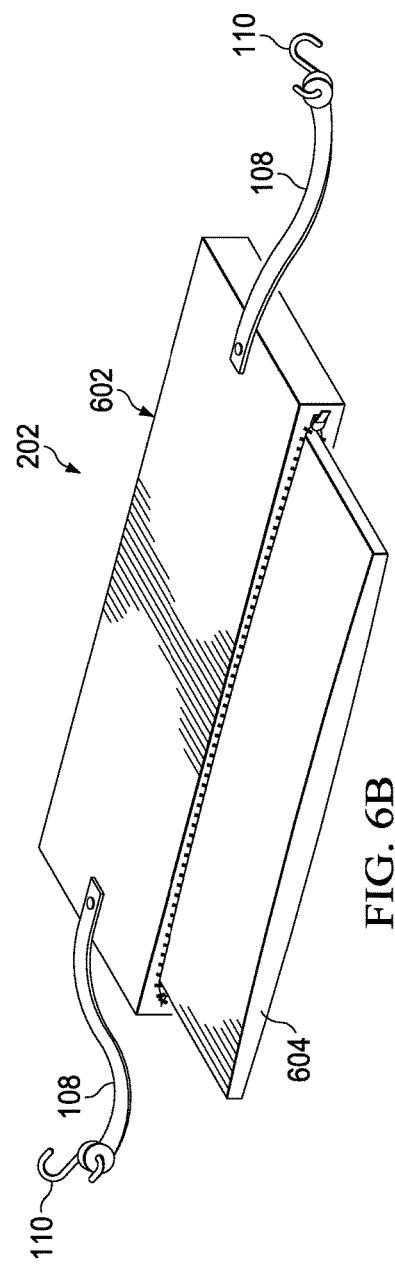
FIG. 6A
FIG. 6B

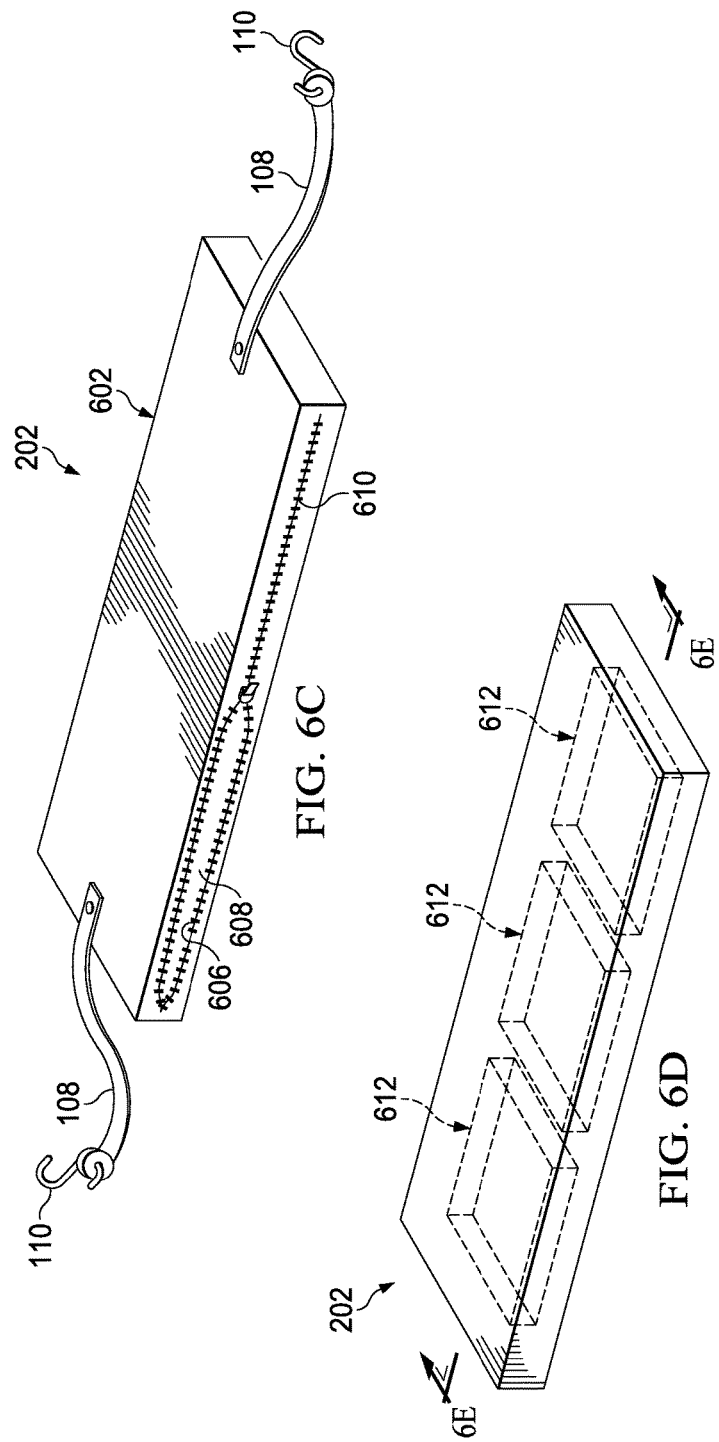
FIG. 6C
FIG. 6D
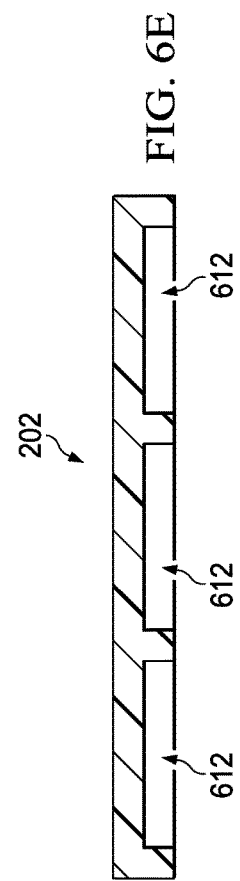
FIG. 6E

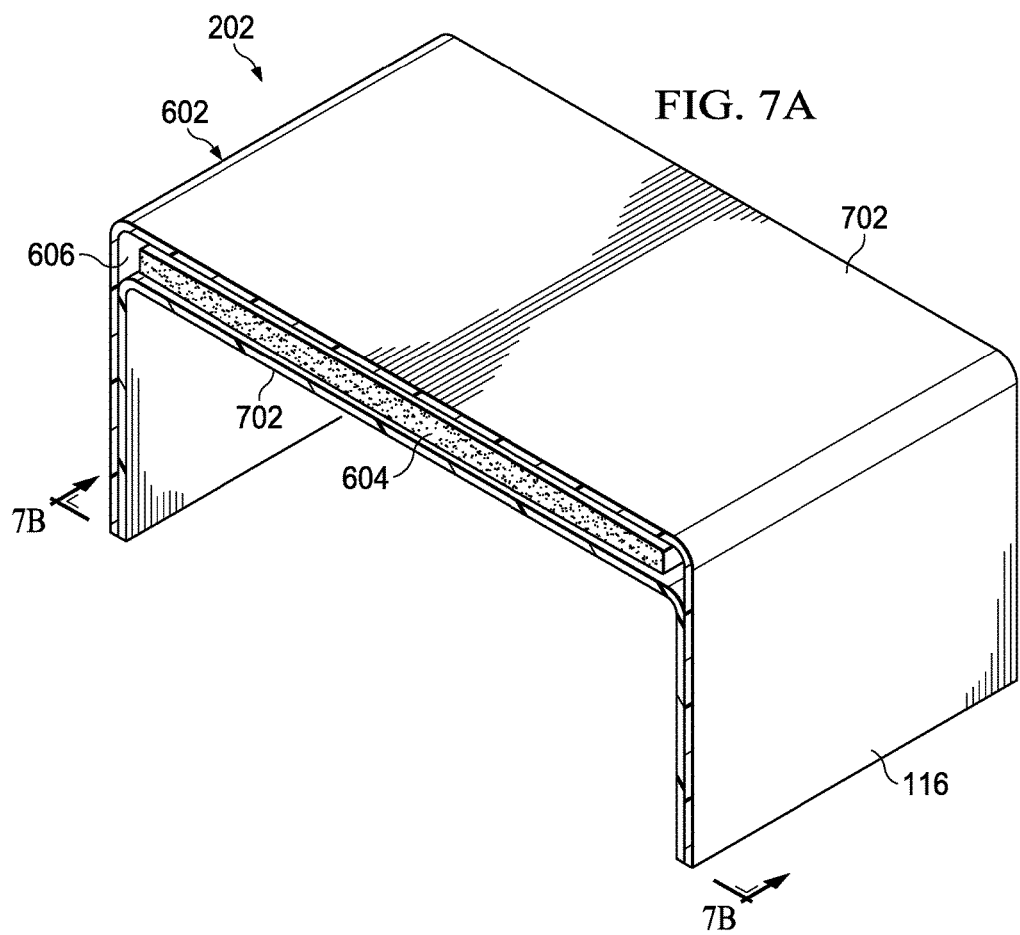

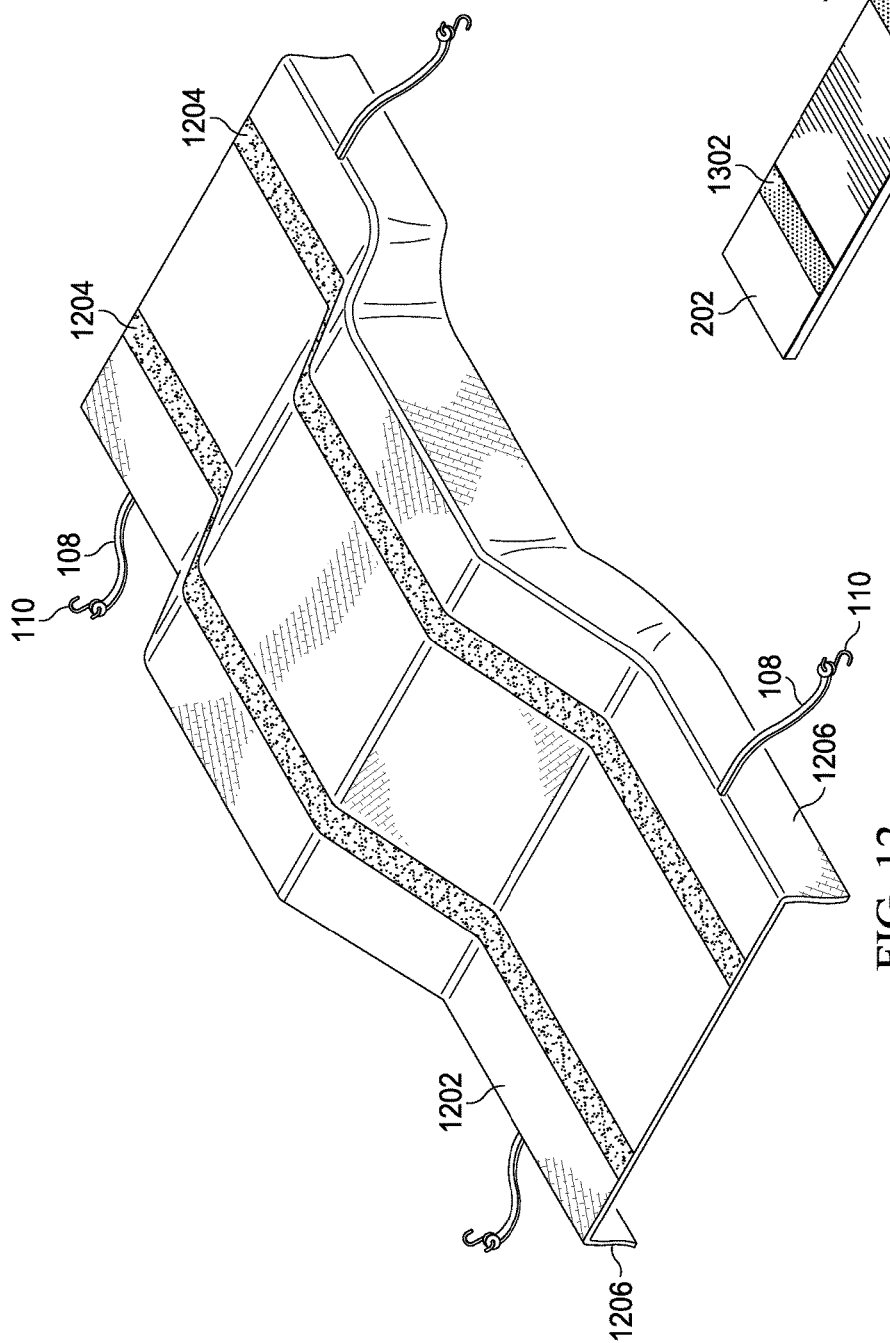

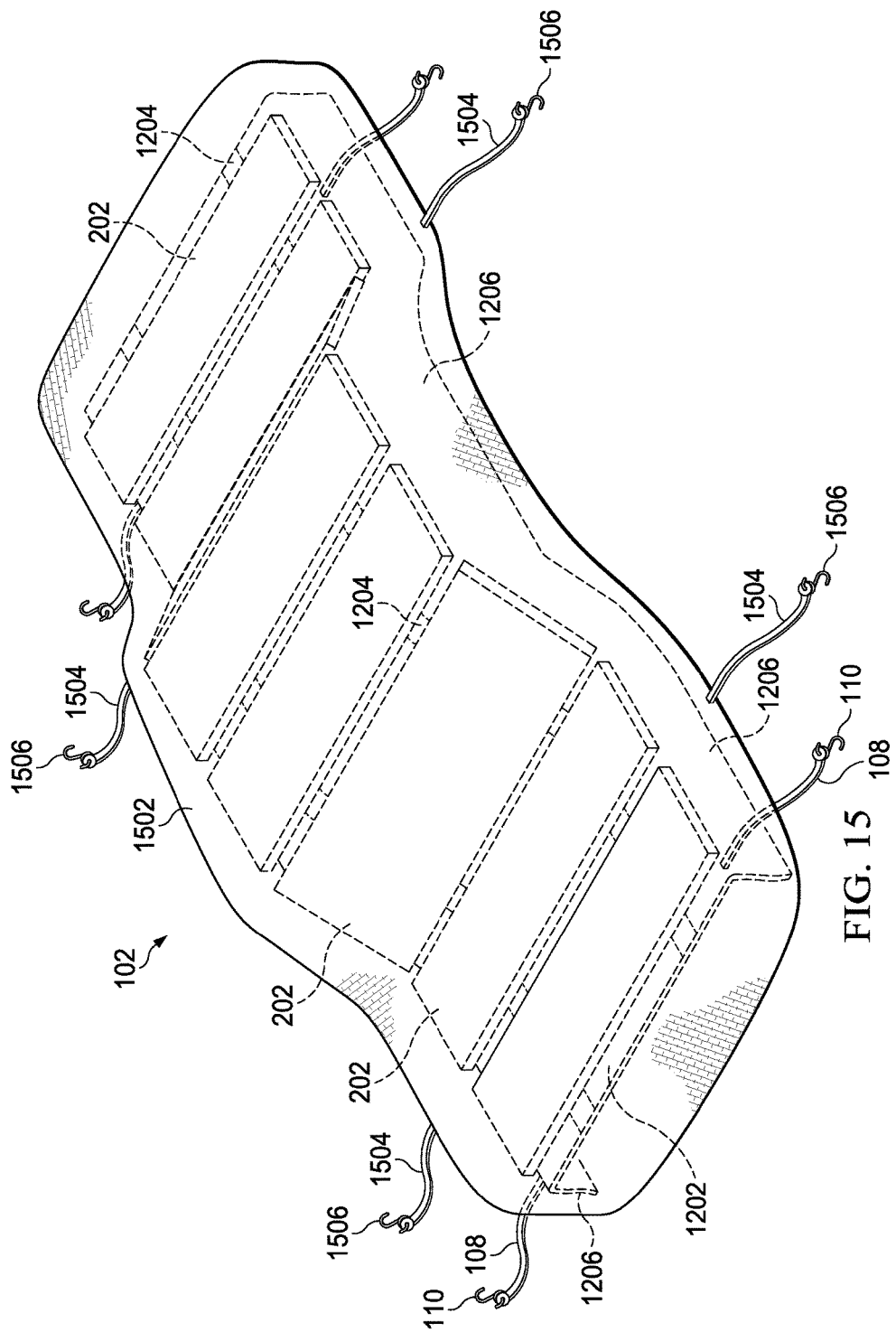

US 9,994,097 B2

HAIL-RESISTANT VEHICLE COVER

TECHNICAL FIELD

The following disclosure relates to protective covers for cars and other vehicles.

BACKGROUND

Every year, hail storms cause large amounts of damage throughout the United States. A significant portion of this damage comes in the form of hail damage to cars and trucks. The damage to a single vehicle can require thousands of dollars of repair work. Since many drivers do not park their cars in garages or under other coverings, their vehicles spend a significant amount of time exposed to potential hail storms.

SUMMARY

A hail-resistant vehicle cover is provided that is used to protect cars and trucks from hail damage. The vehicle cover includes straps with fixing members such as hooks which secure the cover to the vehicle at a point such as the underside of the vehicle's body, or any other location which can securely anchor a hook. In some embodiments, the vehicle cover includes multiple cover panels which can fold together against each other such that vehicle cover takes up much less space when being stored that it would if it could not fold up. In some of these embodiments, the cover panels are separable from each other. Some embodiments of the vehicle cover include cover panels which are comprised of cover panel sleeves into which impact-resistant cover panel inserts are inserted.

BRIEF DESCRIPTION OF THE DRAWINGS

For a more complete understanding, reference is now made to the following description taken in conjunction with the accompanying Drawings in which:

FIGS. 3A-3D illustrate side views of a hail resistant vehicle cover in different states of folding and unfolding;

FIGS. 6A-6C illustrate perspective views of vehicle cover panel sleeves and vehicle cover panel inserts;

FIG. 6D illustrates a perspective view of a vehicle cover panel;

FIG. 6E illustrates a cross-section view of a vehicle cover panel;

FIG. 7A illustrates a perspective view of a vehicle cover panel with side curtains;

FIG. 12 illustrates a perspective view of a vehicle cover base;

FIG. 13 illustrates a perspective view of a vehicle cover panel which includes hook-and-loop material;

FIG. 15 illustrates a perspective view of a vehicle cover which includes a vehicle cover base and a vehicle cover outer wrapping.

DETAILED DESCRIPTION

Figure 1:
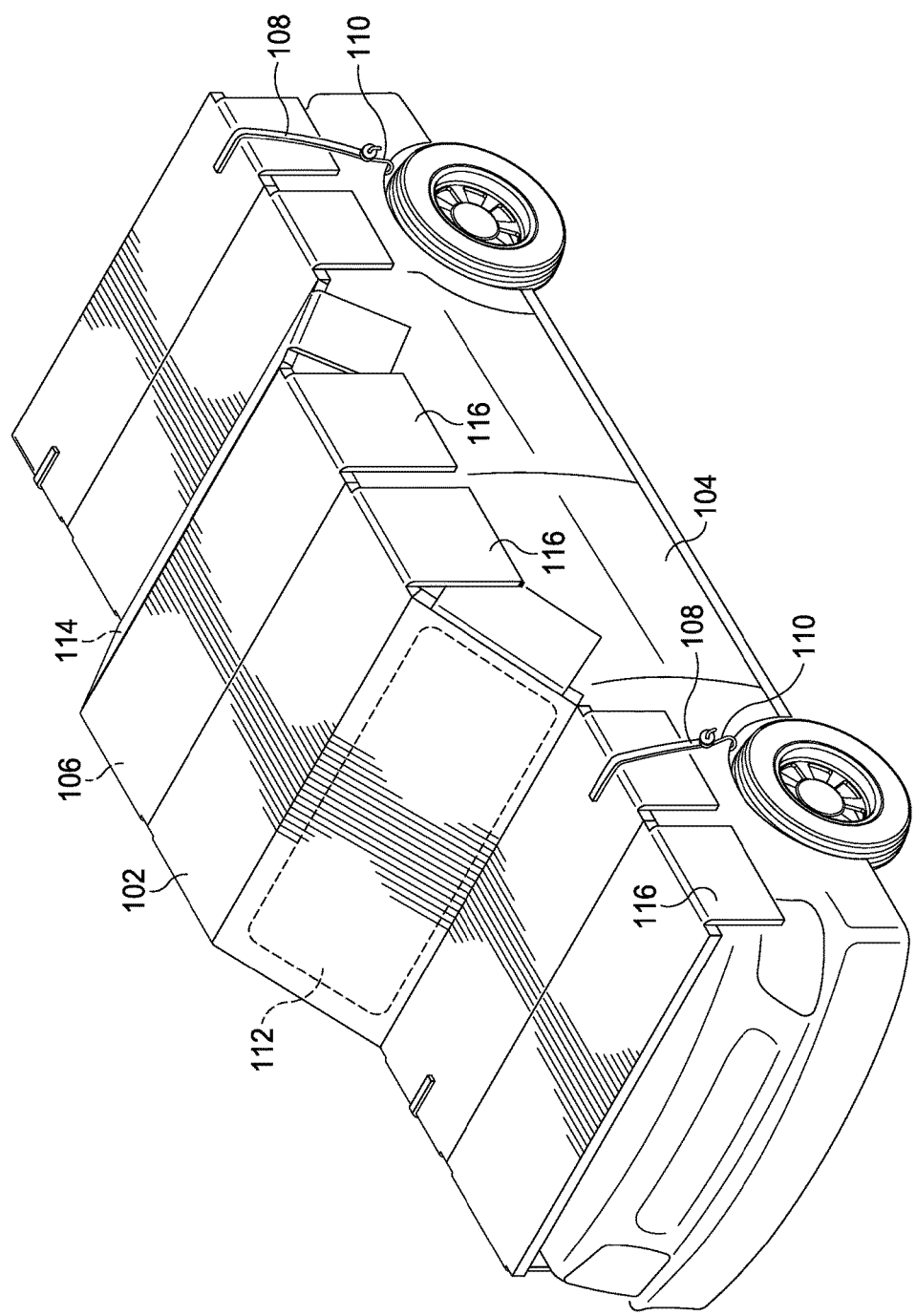
FIG. 1 illustrates a hail-resistant vehicle cover on top of a vehicle.

Referring now to the drawings, wherein like reference numbers are used herein to designate like elements throughout, the various views and embodiments of a hail-resistant vehicle cover are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring first to FIG. 1, there is illustrated an embodiment of a vehicle cover 102 covering a vehicle 104. In FIG. 1, vehicle 104 is a car, but vehicle 104 could also be a truck, a sport-utility vehicle, or any other land vehicle in common use. The vehicle cover 102 sits on top of vehicle 104 and covers most of the top surfaces 106, including the roof, the hood, and, if the vehicle has one, the trunk or truck bed. The vehicle cover 102 also covers and protects the windshield 112 and the rear window 114. The vehicle cover 102 is secured to the vehicle with a set of anchors. In this embodiment, the anchors include straps 108 and fixing members 110. One end of each strap 108 is attached to the vehicle cover 102, while the other end has a fixing member 110 (in this embodiment, a hook) which hooks under the body of vehicle 104 in a location such as the fender or anywhere else where fixing member such as a hook can be secured. Tension in the strap 108 keeps the fixing member 110 secured under the body of the vehicle 104 and the vehicle cover 102 secured to the vehicle. In some embodiments, such as the embodiment shown in FIG. 1, the vehicle cover includes curtains 116 on the sides of the cover 102 that drape over the top part of the sides of the vehicle 104.

Figure 2:
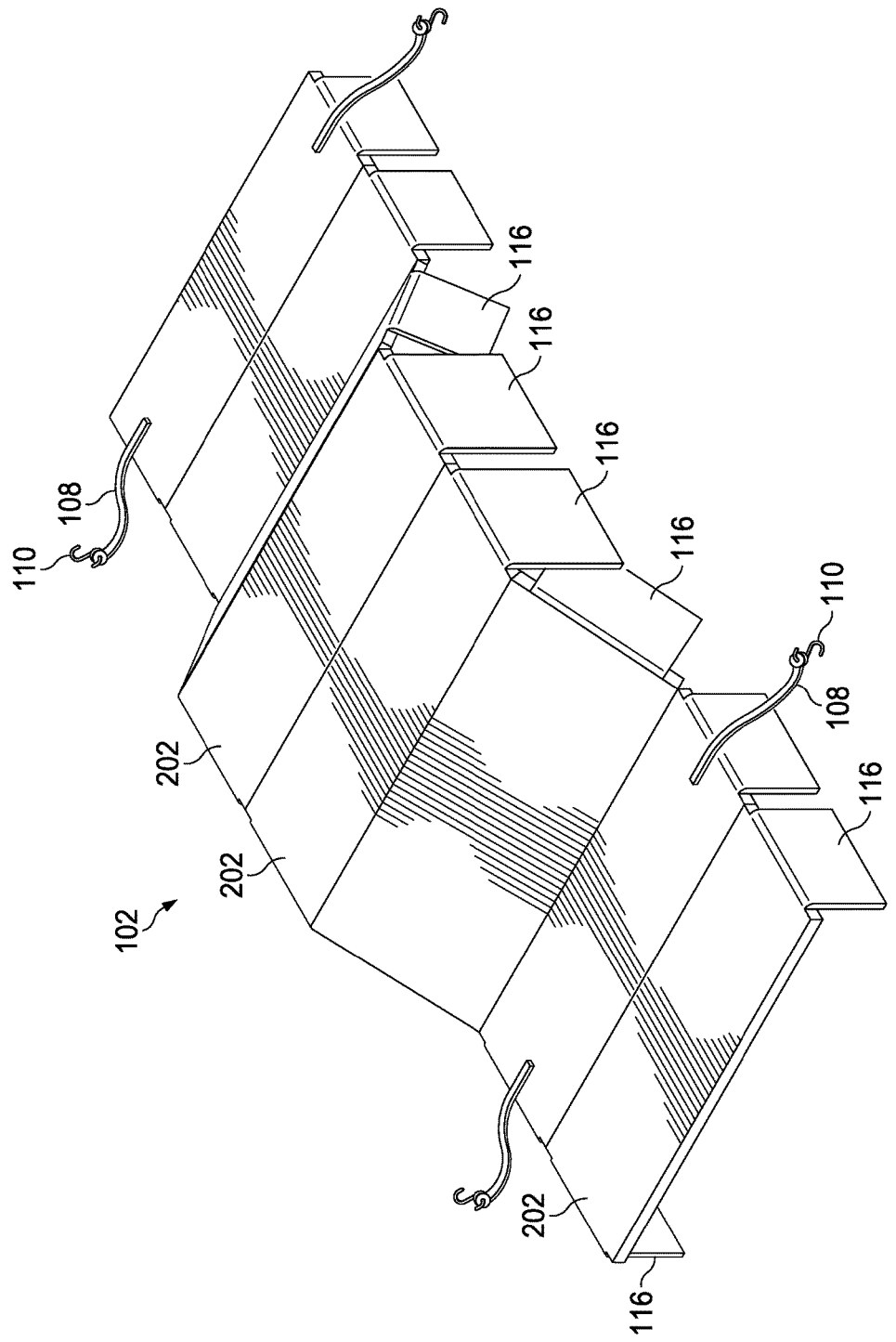
FIG. 2 illustrates a perspective view of a hail-resistant vehicle cover.

Referring now to FIG. 2, there is illustrated another view of vehicle cover 102. In some embodiments, the vehicle cover 102 comprises multiple cover panels 202. These cover panels 202 are impact resistant and help protect the top of the vehicle 104. Each cover panel 202 is connected to the cover panels in front of and behind it by means of a hinge-like joint (described hereinbelow with respect to FIGS. 3A-4C) that allows the cover panels to fold onto each other. In some embodiments, the cover panels 202 are separate units that can be easily connected to each other to form a vehicle cover 102 of a custom length. The panels 202 and how they are connected to each other are described in more detail hereinbelow with regard to FIGS. 3A-4C. As mentioned hereinabove, the vehicle cover 102 is secured to a vehicle 104 via straps 108 and fixing members 110. The vehicle cover 102 has enough straps 108 to securely anchor the cover to the vehicle 104. In some embodiments, the vehicle cover 102 has at least four straps 108, one located near each corner of the vehicle 104. In some embodiments, the straps 108 include bungee cords or are made of a similarly elastic material. Using an elastic material for the straps 108 allows them to stretch to the length required for the fixing members 110 to be positioned under the body of the vehicle 104 or to any other location of an appropriate anchoring point. When the fixing members 110 are secured to the vehicle 104, the straps 108 will be stretched and in a state of tension, which will pull the fixing members against their anchor points, further securing the vehicle cover 102 to the top of the vehicle 104. The end of each strap 108 that is attached to a cover panel 202 can be attached by any appropriate means. In some embodiments, the straps 108 are sewn to cover panels 202. In other embodiments, an adhesive is used. In still other embodiments, a hook-and-loop attachment is used, whereby the cover panel 202 will have a patch or strip of hook material, and the end of the strap 108 will have a loop material (naturally, this could be reversed, wherein the panel 202 has loop material and the strap 108 has hook material). The end of each strap would typically be attached to the cover panel 202 near the side edge of the cover panel, but in some embodiments is attached at other points on the panel. In some embodiments, such as the embodiment illustrated in FIG. 2, the cover panels 202 include side curtains 116 that drape over the side of the vehicle 104. This provides added protection to the sides of the vehicle from hail. As described further hereinbelow with respect to FIG. 8, the curtains 116 in some embodiments are thinner than the rest of the cover panel.

Referring now to FIGS. 3A-D, there are illustrated several depictions of a vehicle cover 102 in various states of folding. Turning first to FIG. 3A, there is illustrated a side view of a vehicle cover 102 in a fully unfolded state. Visible in FIG. 3A are panel joints 302 which connect the cover panels 202 to each other. Note that the panel joints 302 alternate between the upper and lower sides of the vehicle cover 102. That is, progressing from front to back of the cover 102 (left to right in FIGS. 3A-D), the joint 302 between the first and second panels 202 is on the upper side of the cover, the joint 302 between the second and third panels is on the lower side of the cover, the joint 302 between the third and fourth panels is on the upper side of the cover, and so on. Of course, the joints on the cover 102 could be configured in an alternating fashion such that the joint 302 between the first and second panels 202 is on the lower side of the cover; the joint between the second and third panels is on the upper side of the cover; and so on. The purpose for having joints 302 on alternating sides of the vehicle cover 102 is to allow the cover panels 202 to fold in alternating directions, as is described hereinbelow with respect to FIGS. 3B-3D.

Turning to FIG. 3B, there is illustrated another side view of a vehicle cover 102. In FIG. 3B, some of the cover panels 202 are partially folded over the panels next to them. Arrows 304 indicate the direction in which panels 202 can fold. For example, cover panels 202a and 202b can fold upwards about their common joint 302, which is on the upper side of the vehicle cover 102. Cover panels 202d and 202e, on the other hand, fold downwards around their common joint 302. The alternating, accordion-like manner in which the cover panels 202 folded over onto each other allows the vehicle cover 102 to be folded into a very compact size.

Turning to FIG. 3C, there is illustrated another side view of a vehicle cover 102. In FIG. 3C, the vehicle cover 102 has the cover panels 202 mostly folded over onto each other in an "accordion" configuration.

Turning to FIG. 3D, there is illustrated another side view of a vehicle cover 102, with the cover panels 202 completely folded over onto each other, resulting in the vehicle cover being in an accordion configuration that is its most folded, most compact state.

Referring now to FIGS. 4A-4D, there are illustrated several different types of joints 302 used in different embodiments to connect vehicle panels 202 to each other. Although in many embodiments the cover panels 202 are detachable from one another, in some embodiments, the joints 302 between the cover panels are permanently affixed to the panels, consequently permanently attaching the cover panels to each other via the joints.

Figure 4A:
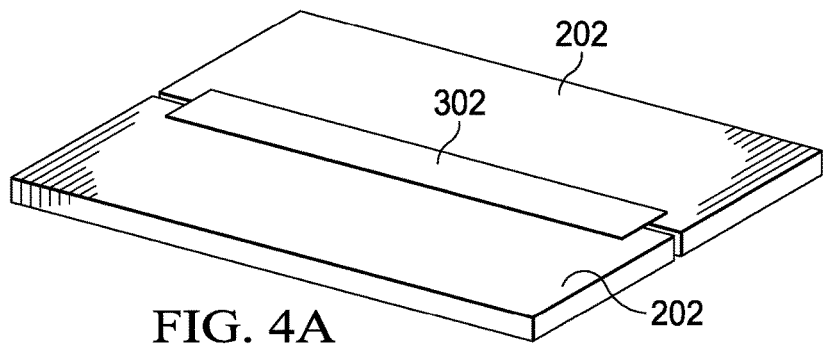
FIGS. 4A-4C illustrate perspective views of different embodiments of joints used to connect vehicle cover panels.

Turning first to FIG. 4A, there is illustrated an embodiment wherein the cover panels 202 are permanently connected to each other via joint 302. The joint 302 may be made of plastic, fabric, or any other material durable enough to withstand hail and severe storms, while also being flexible enough to function as a type of hinge that allows the cover panels 202 to rotate about the joint. The joint 302 is attached to each cover panel 202 via an adhesive, is sewn onto each of the cover panels, or is attached to the cover panels via any other means that is strong and durable enough to hold together cover panels during a thunderstorm or other severe weather event.

Figure 4B:
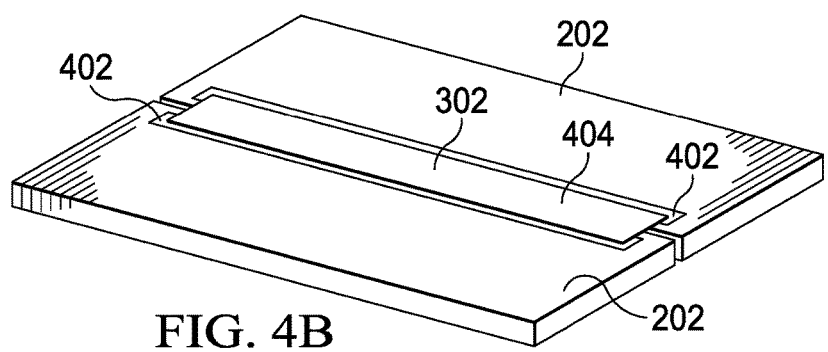

Turning next to FIG. 4B, there is illustrated an embodiment wherein the joint 302 is comprised of a cover panel strip 402 of hook-and-loop material on the surface of each cover panel 202 and a joint strip 404 of material which also has hook-and-loop material on one surface. A joint strip 404 is placed such that its hook-and-loop material makes contact with the hook-and-loop material on the cover panel strip 402 of both cover panels 202 that it connects. This affixes the two cover panels 202 to each other in such a way that the joint strip 404 can be removed from the cover panels 202, and the cover panels can be separated for storage or at other times when they no longer need to be attached to each other. In these embodiments, the cover panel strips 402 will all be of either hook or loop material, and the joint strips 404 will then be the complimentary hook or loop material.

Figure 4C:
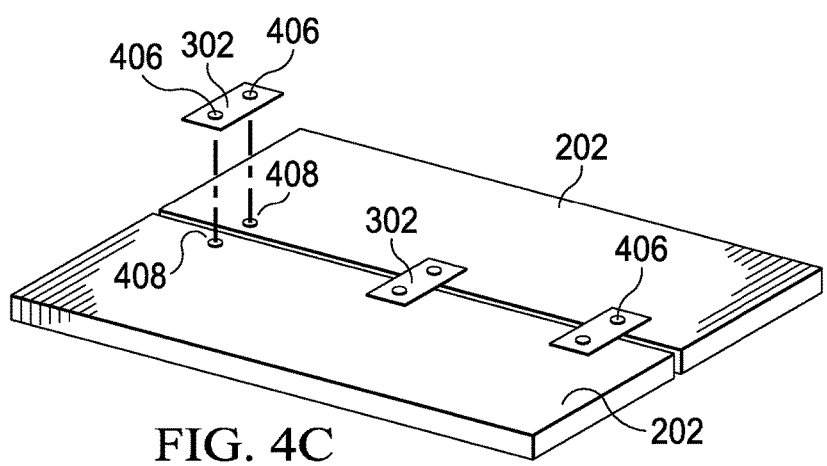

Turning next to FIG. 4C, there is illustrated an embodiment in which the cover panels 202 are detachable from each other and from the joint 302. In this embodiment, multiple joints 302 hold each cover panel 202 to its neighbor. Each of these joints 302 is constructed of fabric, plastic, or any other strong, flexible, waterproof material and includes two snap fastener halves 406, each of which corresponds to a snap fastener half 408 on the cover panels 202 which the joint 302 connects. For each joint 302, one of the snap fastener halves 406 is snapped to a snap half 408 on one cover panel 202, and the other fastener half 406 is snapped to a snap half 408 on the other cover panel 202, linking the two cover panels 202 together in a way that allows them to be detached from each other when needed. Naturally, the snap halves 406, 408 hold together with enough strength to keep from separating during a weather event that would produce hail. In some embodiments, only one joint 302 holds together each cover panel 202, while in other embodiments, such as is illustrated in FIG. 4C, the joint 302 attaching the cover panels to each other actually comprises multiple joints 302.

In all embodiments, the joint 302 may be made of plastic, fabric, or any other scratch-preventative material durable enough to withstand hail and severe storms, while also being flexible enough to function as a type of hinge that allows the cover panels 202 to rotate about the joint.

Figure 5A:
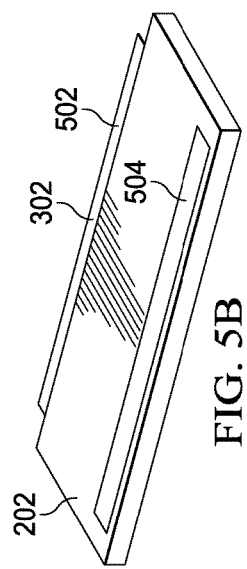
FIGS. 5A-5D illustrate perspective views of vehicle cover panels and how they connect to each other.

Referring now to FIGS. 5A-5D, is illustrated another embodiment in which the joint 302 is part of the cover panel 202. Turning to FIG. 5A, there is illustrated a single cover panel 202 with a joint 302. The cover panel 202 is oriented such that the joint 302 is on the upper surface of the cover panel. In this embodiment, joint 302 is a flap 502 of material attached to the top surface of cover panel 202 and extends over the edge of the cover panel. On the underside of the flap 502 is hook-and-loop material.

Figure 5B:
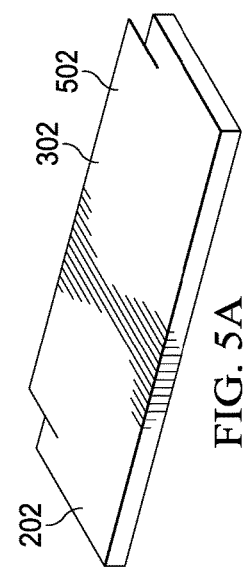

Turning next to FIG. 5B, there is illustrated an identical cover panel 202 as in FIG. 5A, except that the cover panel in FIG. 5B is oriented such that its joint 302 is on the underside of the cover panel. Also visible on the cover panel 202 in FIG. 5B is a strip 504 of hook-and-loop material. This strip 504 is on the opposite surface as the joint 302 (in the case of FIG. 5B, the upper surface). An identical strip 504 is also on the cover panel 202 illustrated in FIG. 5A, but it is on the lower surface, which is not visible in view of FIG. 5A.

Figure 5C:
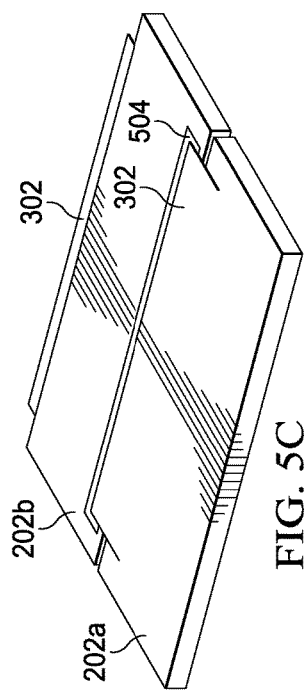

Turning next to FIG. 5C, there are illustrated two cover panels 202, identical to those in FIGS. 5A and 5B. The cover panels 202 are oriented such that the hook-and-loop material on the joint 302 of cover panel 202a overlaps and is affixed to the hook-and-loop strip 504 of cover panel 202b on the opposite end and opposite surface of cover panel 202b that includes a joint 302. By alternating orientations in this way, additional cover panels 202 can be added to create a vehicle cover 102 that is foldable, as described hereinabove with respect to FIGS. 3A-3D.

Figure 5D:
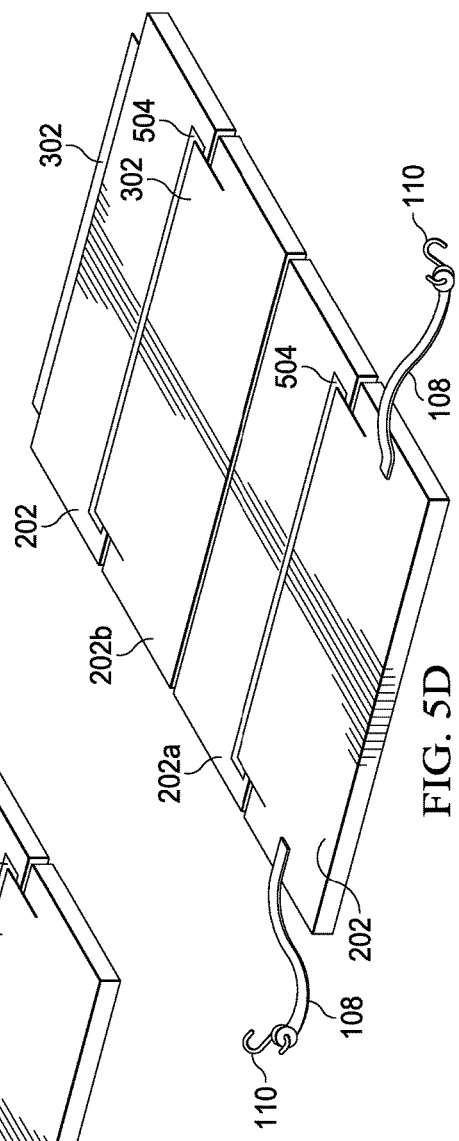

Turning to FIG. 5D, this concept is illustrated. For example, the joint 302 of an additional cover panel 202 may be affixed to the underside of cover panel 202a, and the joint 302 of cover panel 202b could be affixed to the underside of yet another additional cover panel 202. By repeating this process, as many cover panels 202 as needed can be affixed to each other to create a vehicle cover 102 of any desired length. Note that the exact type of joint 302 may vary. In some embodiments, it will be of the hook-and-loop types described hereinabove, while in other embodiments, it may be of any of the other types described hereinabove.

In embodiments in which the cover panels 202 are detachably affixed to each other, a vehicle cover 102 can be easily assembled and disassembled simply by connecting and disconnecting cover panels to each other as necessary. Another benefit of this "modular" approach to the configuration of a vehicle cover 102, is that a vehicle cover of a custom size can be assembled. Instead of having to produce vehicle covers 102 of multiple different sizes to account for different vehicle sizes, manufacturers only need to produce and sell the cover panels 202 and joints 302. A vehicle owner can then purchase enough cover panels 202 to create a vehicle cover 102 long enough to cover the hood, roof, and trunk (or truck bed) of his/her particular vehicle 104.

Referring now to FIGS. 6A-6C, there are illustrated an embodiment of a cover panel 202 which includes a shock-absorbing insert. Much of the cost of an item that a consumer pays is actually from the transportation of the item from overseas. Producing an item that is easily and efficiently transportable helps reduce the consumer price of an item. The embodiments shown in FIGS. 6A-6C address this issue.

Turning to FIG. 6A, there is illustrated a cover panel 202. In this embodiment, the cover panel 202 includes a cover panel sleeve 602 and cover panel insert 604. Cover panel sleeve 602 is generally hollow and forms chamber 606 on its interior. Cover panel sleeve 602 also includes an opening 608 on one of its side (preferably a side other than the upper or lower surface). The opening 608 opens into the chamber 606. Cover panel insert 604 is sized such that it is approximately the same shape and volume as the chamber 606 and can fit through the opening 608. In these embodiments, the cover panel insert 604 provides much of the impact protection for the vehicle 104 against hail damage. The cover panel insert 604 may be made of an impact resistant material such as open or closed cell foam, rubber, gel, or any other impact resistant material. In some embodiments, the cover panel insert is actually a rubber or plastic bladder that can be filled with water or inflated with air.

The cover panel sleeve 602 can take different forms. In some embodiments, the sleeve 602 is a semi-rigid shell, providing some impact resistance itself, while still allowing some of the impact force to be absorbed by the cover panel insert 604. In other embodiments, the cover panel sleeve 602 is flexible, like a pocket or pillow case. In these embodiments, the cover panel sleeve may be constructed of cloth, fabric, rubber, vinyl, a flexible plastic, or any other material that will deform when impacted without being damaged, allowing the cover panel insert 604 to absorb most of the impact force. In many embodiments, the cover panel sleeve 602 material will be a scratch-preventative material. The opening 608 on the side of the cover panel sleeve allows for the cover panel insert 604 to be inserted into the sleeve 602.

Turning to FIG. 6B, there is illustrated a cover panel 202 wherein the cover panel insert 604 is partially inserted into a cover panel sleeve 602.

At least some of the cover panels 202 will also include straps 108 and fixing members 110. The straps 108 are affixed to the exterior of the cover panel sleeves 602. In some embodiments, the straps 108 are permanently affixed to the cover panel sleeves 602, while in other embodiments, each strap 108 has hook-and-loop material on the end that attaches to the cover panel sleeve 602, and the cover panel sleeve has complimentary hook-and-loop material in the location where the strap is to be attached. In some embodiments, all of the cover panel sleeves 602 include hook-and-loop material for attaching straps 108, allowing for straps to be connected to any of the cover panels 202 that make up the vehicle cover 102. In other embodiments, only certain cover panel sleeves have the hook-and-loop material for attaching straps.

Turning to FIG. 6C, there is illustrated an embodiment of a cover panel 202 with the opening 608 of the cover panel sleeve 602 partially closed. In some embodiments, the opening 608 cover panel sleeve 602 can be closed. This prevents the cover panel insert 604 from coming out of the sleeve at an inconvenient time, such as in the middle of a storm. In these embodiments, the cover panel sleeve 602 includes a zipper or other closing means 610 that can allow the opening 608 to be easily opened and closed. Thus, when the cover panel insert 604 is to be inserted or removed from the cover panel sleeve 602, the closing means 610 can be used to open the opening 608. Then, when the cover panel insert 604 is either inserted or removed, the closing means 610 can be used to close the opening 608.

Turning now to FIG. 6D, there is illustrated a perspective view of an embodiment of a cover panel 202 with concave cavities 612 on the underside of the cover panel. In these embodiments, the cover panel 202 may not include a chamber 606 or an insert 604. Instead, the cover panel 202 may be solid or of a unibody construction. In these embodiments, like that illustrated in FIG. 6D, the cover panel 202 includes hollowed-out cavities 612 on the underside of the cover panel. These cavities 612 can be advantageous, as they will save on the amount of material used in constructing the cover panels 202. Also, the cavities 612 will still provide protection against hail, since impacts against parts of the panel 202 under which there is a cavity will cause the cover panel material to flex into the gap between the vehicle 104 and the top of the cavity 612. Thus, in these embodiments, thick padding is not necessary over the entire area of the cover panel 202, since the gaps between the vehicle 104 and the cover panel material formed by the cavities 612 will provide adequate impact protection.

Turning to FIG. 6E, there is illustrated a cross-sectional view of the cover panel illustrated in FIG. 6D.

Figure 7B:
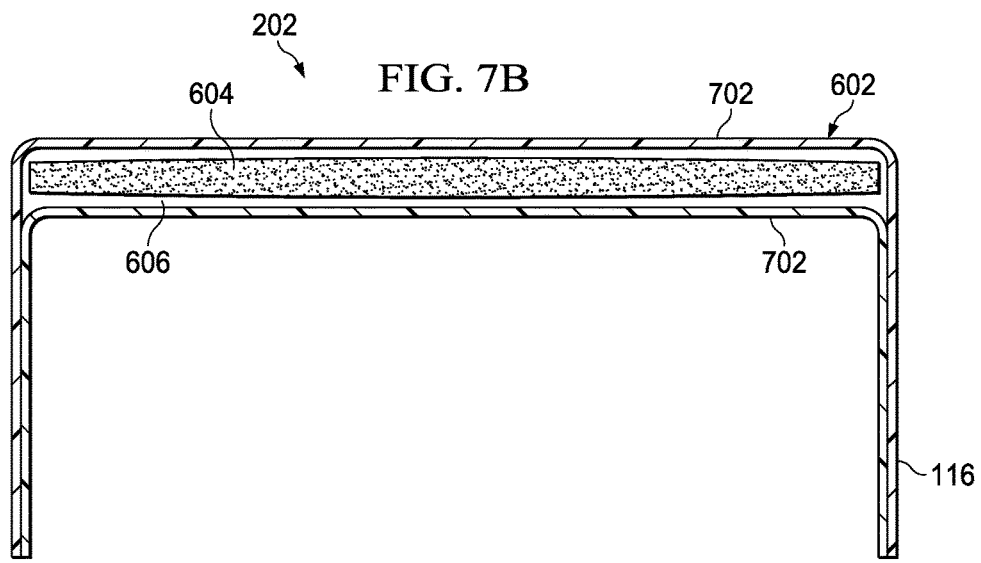
FIG. 7B illustrates a cross-section end view of a vehicle cover panel with side curtains.

Turning to FIGS. 7A and 7B, there is illustrated an embodiment in which the cover panels 202 include side curtains 116. The embodiments shown in FIGS. 7A and 7B also include chambers 606 and panel inserts 604, but other embodiments having side curtains 116 may not include chambers or panel inserts. Referring to FIG. 7A, there is illustrated a view of a cover panel 202. In this embodiment, the cover panel sleeve 602 is made of multiple sheets 702 of material that are connected together at the edges to form the sides of the cover panel sleeve 602 and the chamber 606. In some embodiments, the one or more of the sheets 702 extend beyond where the sheets come together and form the side curtains side curtains 116. For example, in the embodiment of FIGS. 7A-B, the sheets 702 forming the panel sleeve 602 converge at the edges of the panel sleeve to the form the boundaries of chamber 606 and the sides of the cover panel sleeve. Instead of terminating at the point where they converge, the sheets 702 continue to extend past that point. The sheets 702 may or may not be affixed to each other past the point where they converge. Either way, the sheets 702 form flaps which act as the side curtains 116 and provide some protection to the sides of the vehicle 104. In embodiments where the sheets 702 are affixed together, they may be attached to each other in any appropriate way to form the side curtains 116. For example, the sheets 702 may be sewn together, glued together, secured to each other with buttons, or secured to each other with hook-and-loop material.

The sheets 702 may be made of a variety of scratch-preventative materials. For example, in some embodiments, the sheets 702 are made of rubber. In other embodiments, the sheets 702 are made of breathable polyester. In still other embodiments, the sheets 702 are made of cloth. In yet other embodiments, the sheets 702 are made of plastic. In some embodiments, both the upper and lower sheets 702 are made of the same material, while in other embodiments, they are made of different types of material.

Since the side curtains 116 in the embodiment shown in FIG. 7A do not include an impact resistant insert 604 like the one that is inside the chamber 606, they will not provide as much impact resistance as the part of the cover panel 202 that covers top surfaces of the vehicle 104. However, as discussed hereinbelow with respect to FIG. 8, this is not an issue, since hail stones will generally not impact the sides of vehicle 104 with the same force as they would impact the top of a vehicle.

Naturally, other embodiments will have variations of the side curtain 116 illustrated in FIGS. 7A-B. In some embodiments, only one cover panel sleeve sheet 702 will extend beyond where the sheets converge, meaning that the side curtains 116 will each be only one sheet 702 of material. In some embodiments, the side curtains 116 will be separate pieces from the rest of the cover panel 202. In some embodiments, the side curtains 116 will be removable. Other embodiments may in fact have additional or different material between the sheets 702 of the side curtains 116 or as part of the side curtains. The side curtains 116 are different lengths in different embodiments. In some embodiments, the length of the side curtains is between 12% and 25% of the distance between one side of the cover panel 202 and the other side of the cover panel 202 (the left and right sides). In other embodiments, the length of the side curtains 116 is between 80% and 100% of the distance from one side of the cover panel 202 to the other side of the cover panel (the left and right sides). In some embodiments the width of the side curtains 116 extends from the rear of the cover panel 202 all the way to the front of the cover panel, while in other embodiments, the width of the side curtain is between 70% and 100% of the distance between the front and rear edges of the cover panel.

Referring now to FIG. 7B, there is illustrated another view of the embodiment depicted in FIG. 7A.

Figure 8:
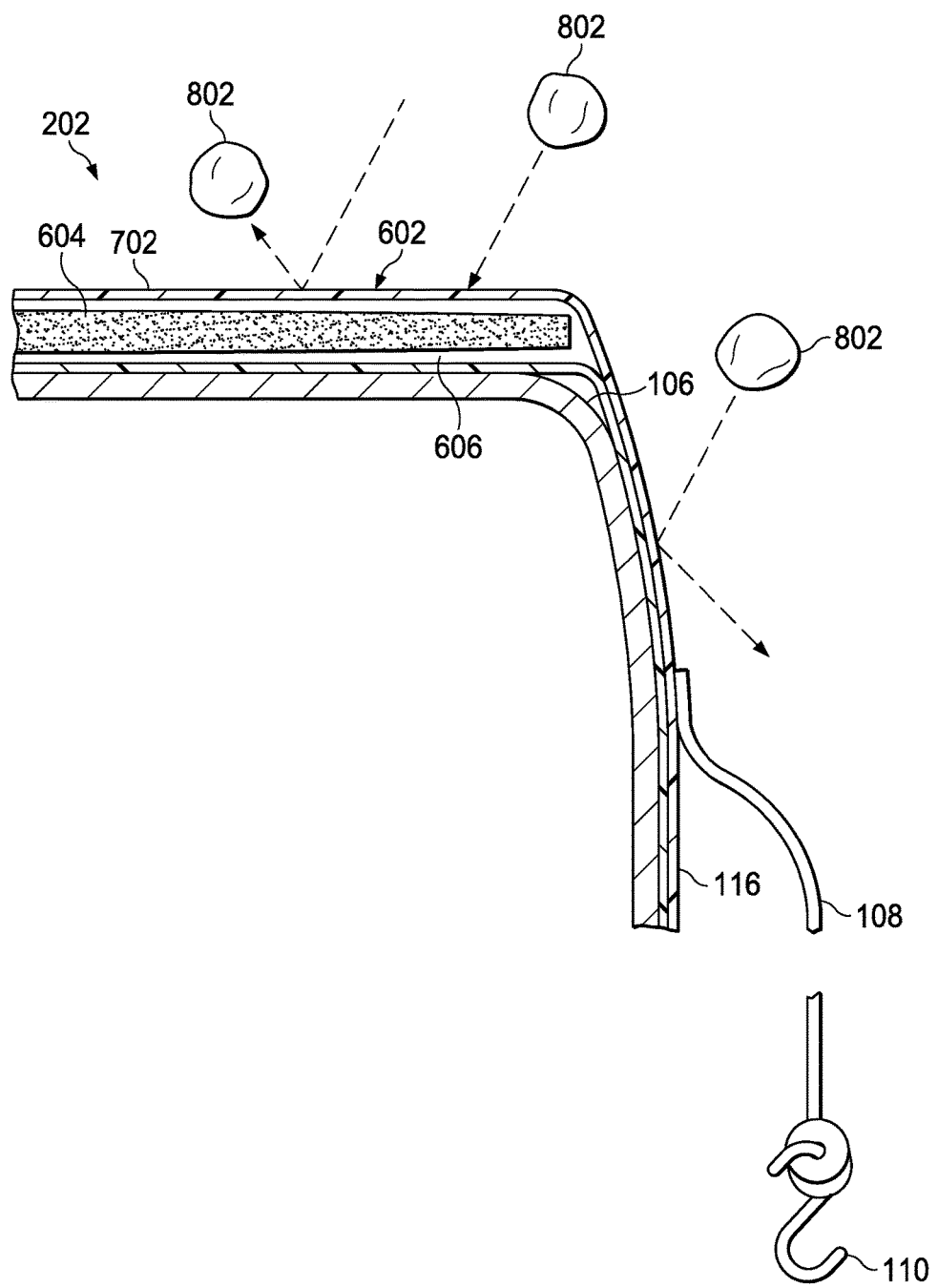
FIG. 8 illustrates a cross-section end view of a portion of a vehicle cover panel with side curtains on a vehicle with hail stones impacting the cover panel.

Turning now to FIG. 8, there is illustrated cross section view of cover panel 202, from an embodiment like that of FIG. 7A, placed on a top surface 106 of a vehicle 104, with a side curtain 116 draped over the top part of the side of the vehicle. FIG. 8 illustrates how the cover panel 202 protects the vehicle surface 106 from damaging hail stones 802. The portion of the cover panel 202 which provides the most impact resistance, that is, the portion that includes the cover panel sleeve 606 and the cover panel insert 604, rests on the top surface 106 of the vehicle 104 (although the same principles apply to a cover panel 202 resting on the hood, trunk, or any other upward facing surface of a vehicle 104). It is important to have a high degree of impact resistance on upward facing surfaces, such as top surface 106, because this is where hail stones 802 will cause the most damage to an unprotected vehicle. Since hail stones 802 fall in a mostly vertical direction (even if there is high wind, hail stones will have a small horizontal component of velocity compared to their vertical component), a hail stone 802 will impact an upper facing surface of a vehicle 104 at a nearly perpendicular angle, creating a high impact force. On the other hand, a hail stone 802 that impacts the side of a vehicle 104 will do so at a very shallow angle with the side surface of the vehicle 104, since only a small amount of the hail stone's velocity will be in a horizontal direction, that is, in a direction perpendicular to the side surface of the vehicle 104. Because of this, the side surface of the vehicle 104 encounters a relatively small impact force from a falling hailstone 802. Since the side surfaces of the vehicle 104 will typically encounter a smaller impact force from hail stones 802 than the top surface 106, the curtain does not need to have a thick, impact resistant layer of material. Instead, the protection provided to the vehicle sides by thinner side curtains 116 (which, in this embodiment, are extensions of the cover sleeve sheets 702) is still sufficient for a typical hail storm.

Staying with FIG. 8, also illustrated is the strap 108 and fixing member 110 (in this embodiment, a hook). One end of the strap 108 is affixed to the cover panel 202. In the embodiment shown, the strap 108 is affixed to the side curtain 116 portion of the cover panel 202. The strap 108 may be affixed to the cover panel 202 in a number of ways. The strap 108 can be sewn to the cover panel 202, hook-and-loop material can be used, adhesive can be used, or even snapping buttons can affix the strap to the cover panel. The embodiment shown in FIG. 8 includes a hook as the fixing member 110. The fixing member 110 would be anchored on appropriate part of the vehicle 104, such as under the fender.

Figure 9A:
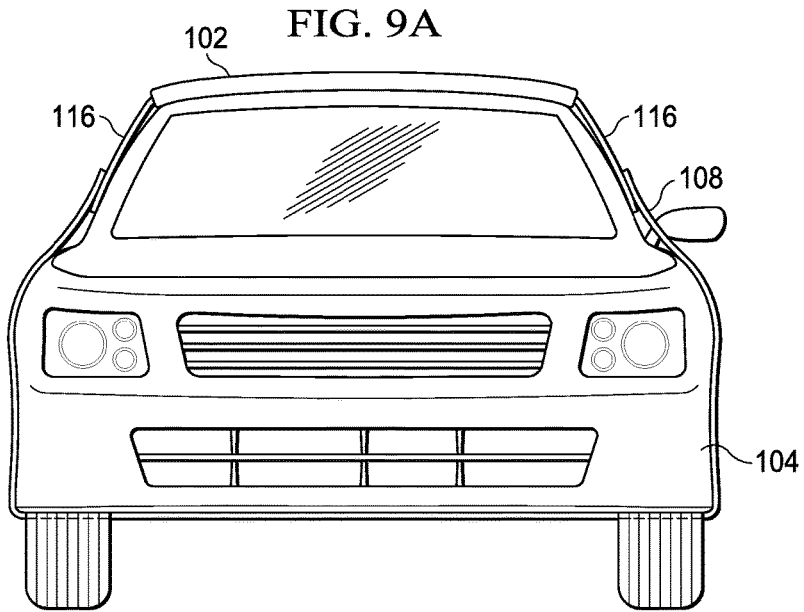
FIG. 9A illustrates a vehicle cover secured to a vehicle.

Turning now to FIG. 9A, there is illustrated a front view of a vehicle 104 with a vehicle cover 102. In this embodiment, the vehicle cover 102 is secured to the vehicle 104 with multiple straps 108 which wrap under the vehicle. Each strap 108 has two ends. The first end is attached to one side of a cover panel 202. The strap 108 then is wrapped under the vehicle 104 to the other side of the vehicle. The second end of the strap 108 is then attached to the other side of the same cover panel 202, thus anchoring the cover panel, and the rest of the vehicle cover 102, to the vehicle 104. This method of anchoring the vehicle cover 102 to the vehicle 104 is also very secure, as there are not fixing members 110 that might come loose from their anchor points. In the embodiment shown in FIG. 9A, the ends of the strap 108 are affixed to the side curtains 116. Different embodiments will have the strap 108 affixed to different parts of the cover panel 202. For example, the strap 108 may, as shown in FIG. 9A, be attached to the side curtains 116. Alternatively, the strap 108 may be attached to the top of the cover panel sleeve 602, or it may be attached to the bottom surface of the cover panel sleeve.

Figure 9B:
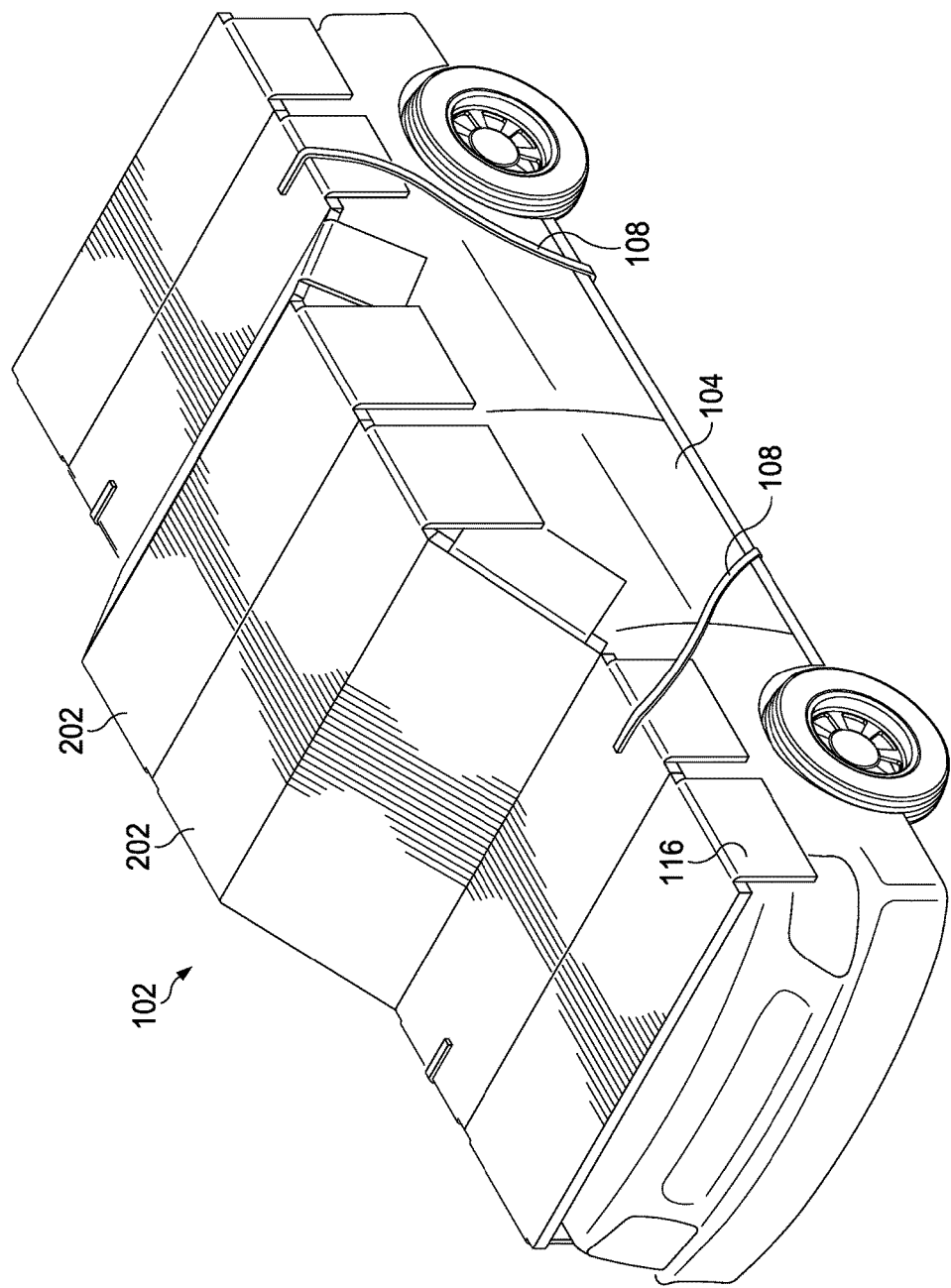
FIG. 9B illustrates a perspective view of a vehicle cover secured to a vehicle.

Turning to FIG. 9B, there is illustrated another view of the embodiment depicted in FIG. 9A. In FIG. 9B, multiple straps 108 are visible. Having multiple straps 108 will better secure the vehicle cover 102 and keep it from lifting off the vehicle 104 during high winds. Like other embodiments, the straps 108 may be affixed to the vehicle cover by a variety of methods, to the cover panels 202 or to the side curtains 116, except that in embodiments in which the straps 108 wrap under the vehicle and attach to the other side of a cover panel 202, at least one of the attachments between the vehicle cover 202 and the strap 108 must be removable, such as hook-and-loop or snapping buttons. Otherwise, it would be very difficult to wrap the strap 108 under the vehicle 104.

Figure 10A:
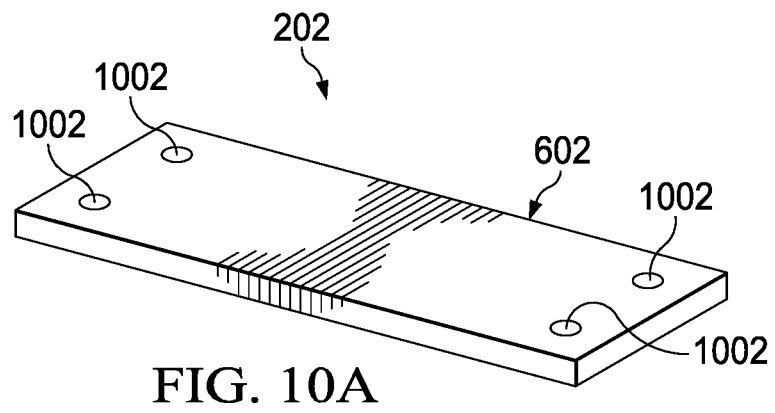
FIGS. 10A-10B illustrate perspective views of vehicle cover panels which include magnets.
Figure 10B:
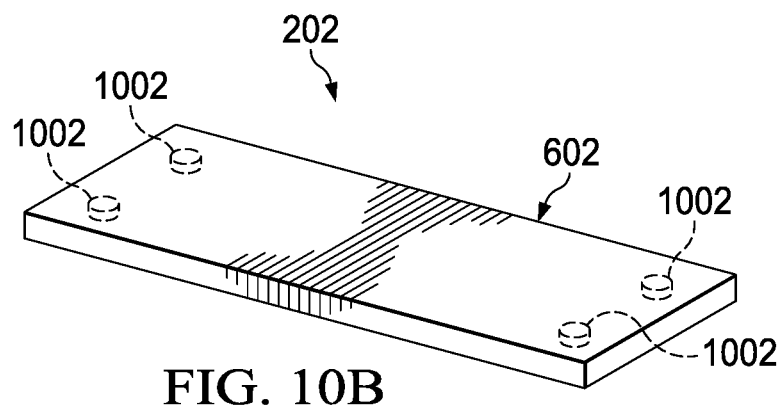

Turning to FIGS. 10A and 10B, there are illustrated perspective views of an embodiment which uses magnets to secure cover panels 202 to the vehicle 104. In some embodiments, instead of being secured to the vehicle 104 by a strap 108 and fixing member 110, the cover panels 202 of the vehicle cover 102 are each secured to the vehicle by magnets. In these embodiments, such as that shown in FIG. 10A, the cover panel 202 includes one or more magnets 1002. In the embodiment shown in FIG. 10A, the magnets 1002 are affixed the outside of the cover panel sleeve 602 (the bottom of the cover panel 202, that is, the side that would abut the vehicle 104, is visible). The magnets 1002 are attracted to the metal body of the vehicle 104 and have strong enough magnetism to firmly secure the cover panel 202 to the vehicle 104 directly or through a protective layer such as a felt or cotton liner. In the embodiment depicted in FIG. 10A, the cover panel 202 includes four magnets 1002, with one magnet near each corner of the cover panel.

Turning now to FIG. 10B, there is illustrated a perspective view of another embodiment which uses magnets 1002 to secure the cover panels 202 to the vehicle 104. This embodiment is similar to that depicted in FIG. 10A, except in the embodiment of FIG. 10B, the magnets 1002 are affixed on the inside of the cover sleeve 602. This configuration provides a slight separation (in the form of part of the cover sleep 602) between the magnets 1002 and the body of the vehicle 104. This separation can help prevent scratches on the body of the vehicle 104 that might occur from the direct contact of the magnets 1002 with the body of the vehicle 104.

Different embodiments will have different numbers, shapes, and configurations of magnets 1002 on the cover panels 202. The embodiments shown in FIGS. 10A and 10B each have four magnets 1002, one near each corner of the underside of the cover panel 202. In some embodiments, each cover panel 202 will have long, strip-shaped magnets 1002 near one or more edges of the underside of the cover panel. Some embodiments have numerous magnets 1002 affixed to several locations on the underside (or inside the underside) of the cover panel 202. Still other embodiments will have a single magnet 1002 on the cover panel 202 which is large enough to securely hold the cover panel onto the vehicle body 104.

Figure 11A:
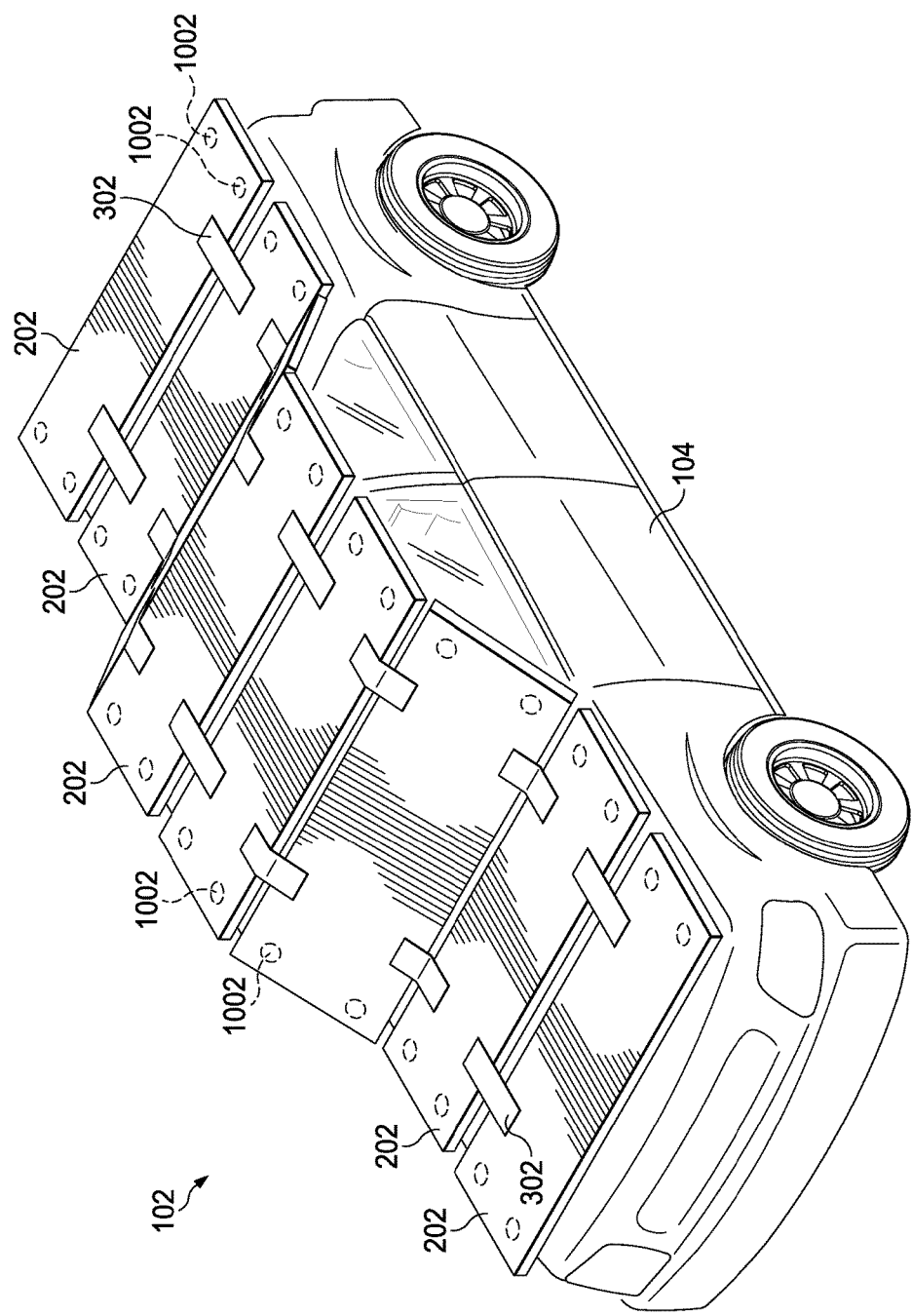
FIG. 11A illustrates a perspective view of a vehicle cover disposed on a vehicle.

Turning now to FIG. 11A, there is illustrated a perspective view of a vehicle cover 102 which includes cover panels 202 secured to a vehicle 104 with magnets 1002. Each cover panel 202 is individually secured to the vehicle 104 because of the magnets 1002 on the underside of each cover panel. In some embodiments which use magnets 1002 to secure the cover panels 202 to the vehicle 104, the cover panels will still include joints 302 which connect the cover panels to each other. In other embodiments, each cover panel 202 is a completely separated from the other cover panels, with no cover panel joints 302. In these embodiments, a plurality of the cover panels 202 depicted in FIGS. 10A and 10B would be enough to form a complete vehicle cover 102. In other embodiments, some of the cover panels 202 may be connected to each other by joints 302. This would be useful in certain cover panels 202 protect areas of the vehicle 104 that may not include enough metal onto which the magnets 1002 to secure the cover, e.g., the windshield, moonroof, or rear window of the vehicle. Some of the embodiments which include magnets 1002 will also include straps 108 and securing members 110 to provide additional anchors to the vehicle 104. It should be noted that while the embodiment depicted in FIG. 11 does not include side curtains 116 on the cover panels 202, some embodiments that use magnets 1002 to secure the cover panels to the vehicle 104 will still include side curtains.

Figure 11B:
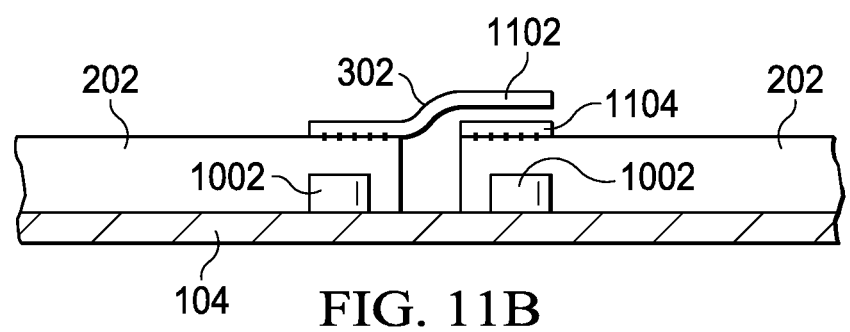
FIG. 11B illustrates a partial cross-section side view of cover panels which include magnets and connecting joints.

Turning now to FIG. 11B, there is illustrated an embodiment in which the cover panels 202 include magnets 1002 and hook-and-loop material joints 302. In these embodiments, the joints 302 may be included on all of the cover panels 202, or the joints 302 may only be on cover panels which cover parts of the vehicle 104 to which magnets would not be attracted. For example, cover panels 202 covering the windshield or rear window of a vehicle 104 may include the joints 302 as a way of securing them to other cover panels which are covering magnetically attractive parts of the vehicle. In one embodiment, the joint 302 includes a strip 1102 of material. One end of the strip 1102 is sewn or otherwise permanently attached to the front or rear edge of each cover panel 202. Each cover panel 202 also includes a patch 1104 of hook-and-loop material on the other of the front or rear edge from the strip 1102. The other end of the strip 1102 includes hook-and-loop material which attaches to the patch 1104 of hook-and-loop material on the other cover panel 202. As explained hereinabove, some embodiments will include these joints 302 on each cover panel, while in other embodiments, only specific cover panels 202 will include the strips 1102 and patches 1104.

Figure 11C:
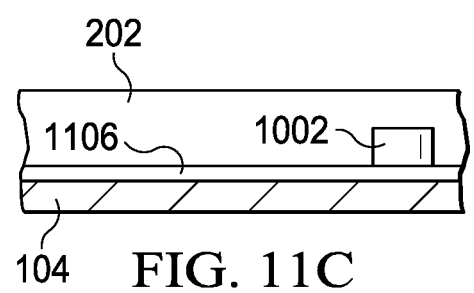
FIG. 11C illustrates a partial cross-section side view of a vehicle cover which includes a protective scratch-preventative layer disposed under a cover panel.

Turning now to FIG. 11C, there is illustrated another embodiment in which the vehicle cover 102 includes magnets 1002 in the cover panels 202, and also includes a protective layer 1106 of material under part or all of each of the cover panels 202. The protective layer 202 helps protect the paint of the vehicle 104 from being scratched by the magnets 1002, or by a portion of the cover sleeve 602 if it is pressed against the vehicle by one or more of the magnets. This protective layer 1106 may be a sheet that lies under the entirety of the surface areas of the lower surfaces of all of the cover panels 202. In other embodiments, however, the protective layer 1106 may be a patch that covers the magnets 1002, meaning that a vehicle cover 102 may in fact have numerous protective layers 1106. The protective layer 1106 may be made of a variety of scratch-preventative materials, such as vinyl, cloth, cotton, foam, felt, rubber, or foam.

Using cover panels 202 which include magnets 1002 allows for a user to quickly and easily install the vehicle cover 102 on the vehicle 104, since the cover panels 202 can effectively affix themselves to the metal vehicle surfaces. In embodiments which only use the magnets 1002 to affix the cover panels 202 to the vehicle 104, no additional straps 108 or fixing members 110 need to be adjusted or configured, making installation onto a vehicle and removal from the vehicle relatively simple.

Turning now to FIG. 12, there is illustrated a perspective view of a vehicle cover base for use in embodiments which include hook-and-loop material to secure cover panels 202 to a vehicle cover base which is then itself secured to the vehicle 104. Referring back to FIG. 12, the vehicle cover base 1202 is a sheet of scratch-preventative material that is large enough to be laid over and cover the top surfaces of the vehicle 104. The vehicle cover base 1202 includes hook-and-loop material 1204 on its top surface. In the embodiment depicted in FIG. 12, the hook-and-loop material 1204 is in two strips near the left and right sides of the vehicle cover base 1202 and run from near the front end to the rear end of the vehicle cover base. The vehicle cover base 1202 includes straps 108 and fixing members 110 which are used to secure the vehicle cover base to the vehicle 104 at appropriate anchoring locations, such as the fender of the vehicle. In some embodiments, the vehicle cover base 1202 will include base side curtains 1206. Thus, instead of, or in addition to, the cover panel side curtains 116, the base side curtains 1206 will give protection to the sides of the vehicle 104. The vehicle cover base 1202 may be made of a number of various materials, including scratch-preventative materials. In some embodiments, the vehicle cover base 1202 is comprised of plastic. In other embodiments, the vehicle cover base 1202 may be comprised of other materials, such as rubber, cloth, vinyl, felt, cotton, or foam.

Turning now to FIG. 13, there is illustrated a perspective view of a cover panel 202 (upside down—with the underside visible) which is used in conjunction with the vehicle cover base of FIG. 12. In these embodiments, strips of hook-and-loop material 1302 are affixed to the exterior of the underside of the cover panel 202 via adhesive, sewing, or any other permanent attachment. The cover panel 202 is positioned such that the hook-and-loop strips 1302 make contact with and affix to complementary strips of hook-and-loop material 1204 on the vehicle cover base 1202, securing the cover panel to the vehicle cover base.

Figure 14:
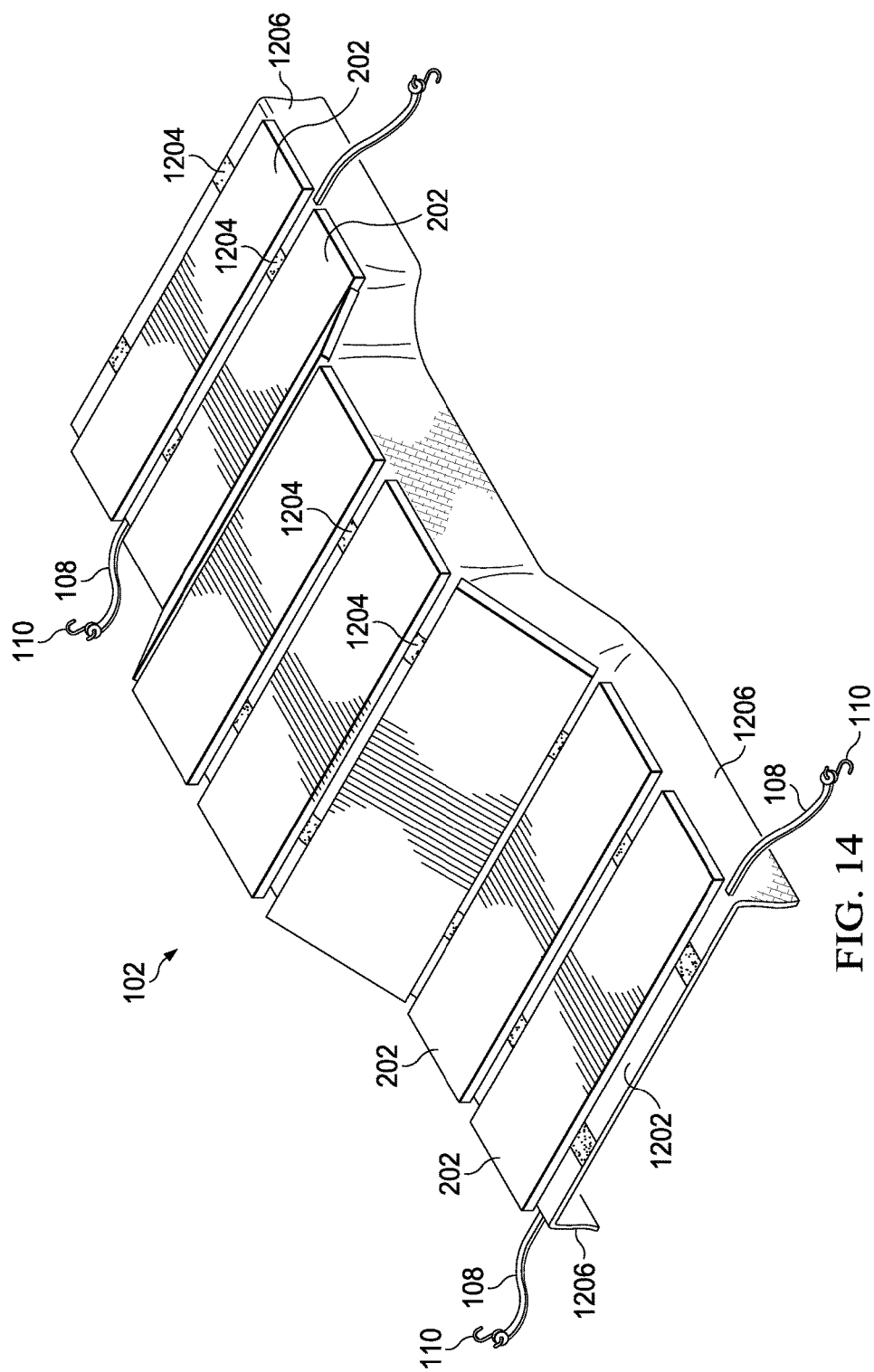
FIG. 14 illustrates a perspective view of a vehicle cover which includes a vehicle cover base and cover panels which include hook-and-loop material.

Turning to FIG. 14, there is illustrated an embodiment of the vehicle cover 102 which includes the cover panels 202 secured to a vehicle cover base 1202 as described hereinabove with respect to FIGS. 12 and 13. The vehicle cover base 1202 is placed on top of the vehicle 104 with the side with the hook-and-loop material 1204 facing upwards away from the surface of the vehicle. Cover panels 202 are placed on top of the vehicle cover base 104 with the sides of the cover panels that include the hook-and-loop material 1302 facing downward and affixing to the hook-and-loop material 1204 of the cover base 1202. In the embodiment shown in FIG. 14, each cover panel 202 is separate from the other cover panels, and the cover panels are not connected to each other by connecting joints 302; they are only connected to the cover base 1204 via the hook-and-loop material. In some embodiments, the cover panels 202 will still include connecting joints 302 which connect some or all of the cover panels to each other.

Turning to FIG. 15, there is illustrated another embodiment which uses hook-and-loop material to affix cover panels 202 to a vehicle cover base 1202, much like the embodiment depicted in FIG. 14. In this embodiment, however, the vehicle cover 102 also includes an outer wrapping 1502. The outer wrapping 1502 is meant to be placed over the vehicle cover base 1204 and the cover panels 202 to provide another layer of protection and to further secure the entire vehicle cover 102. Once the cover base 1202 and the cover panels 202 are placed on the vehicle 104 and secured to the vehicle with the straps 108 and fixing members 110, the outer wrapping 1502 is placed over the vehicle 104 and the cover base and cover panels. The outer wrapping 1502 may cover all of the cover panels 202, or, in some embodiments, parts of the some of the cover panels may not be covered by the outer wrapping. The outer wrapping 1502 includes its own out wrapping straps 1504 and outer wrapping fixing members 1506, which are used to secure the outer wrapping to the vehicle 104. In some embodiments, the outer wrapping 1502 covers the top surfaces of the vehicle 104, but does not extend very far, if at all, over the side of the vehicle. In other embodiments, the outer wrapping 1502 extends down the sides of the vehicle 104 and provides added protection to the sides of the vehicle. In some of these embodiments, the cover panels 202 may not include side curtains 116 if the portions of the outer wrapping that extend over the sides of the vehicle 104 are thick enough to provide adequate protection. The outer wrapping 1502 may be made of a number of various scratch-preventative materials. In some embodiments, the outer wrapping 1502 is comprised of plastic. In other embodiments, the outer wrapping 1502 may be comprised of other materials, such as rubber, cloth, vinyl, or foam.

It should be noted that the outer wrapping 1502 may also be included in alternate embodiments of the vehicle cover 102 with magnets 1002 in the cover panels 202 depicted in FIG. 11, or alternate versions of other embodiments, such as those depicted in FIGS. 1, 2, and 9A-B.

It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A protective cover for a vehicle, the cover comprising:
   a plurality of cover panels, including at least a first cover panel and a second cover panel, each cover panel having a first end and a second end and including:
      a cover panel sleeve, the sleeve including sleeve walls which define a sleeve chamber within the sleeve walls, wherein at least one sleeve wall defines an opening through the sleeve wall for allowing access to the sleeve chamber from the exterior of the cover panel sleeve,
      an impact resistant cover panel insert, the insert being disposed within the sleeve chamber and being removable from the sleeve chamber;

at least one anchor, the at least one anchor including a strap and a fixing member, wherein a first end of the strap is affixed to one of the cover panel sleeves, and a second end of the strap is affixed to the fixing member; and at least one cover panel joint;

wherein each cover panel is adjacent to at least one other cover panel and the first end of the first cover panel is proximal to the second end of the second cover panel;

wherein the first cover panel is affixed at a location proximal to the first end of the first cover panel to a location proximal to the second end of the second cover panel by at least one of the panel joints; and wherein that the first cover panel is rotatable about the cover panel joint such that the first end of the first cover panel be positioned adjacent to the first end of the second cover panel.

2. The protective cover of claim 1, wherein each cover panel is removably affixed to the at least one adjacent cover panel by the at least one of the panel joints.

3. The protective cover of claim 2, wherein the at least one cover panel joint includes hook-and-loop material.

4. The protective cover of claim 1, wherein the strap is comprised of an elastically stretchable material.

5. The protective cover of claim 1, wherein the cover panel insert is comprised of foam.

6. The protective cover of claim 1, wherein each cover panel is affixed to the at least one adjacent cover panel by the at least one of the panel joints, the panel joints comprising a plastic or fabric material and wherein the plastic or fabric material is attached to the cover panels by stitching, gluing, a snap fastener or with a hook-and-loop attachment.

7. The protective cover of claim 1, wherein each cover panel comprises an upper surface and a lower surface, the sleeve chamber disposed between the upper surface and lower surface for receiving the cover panel insert therein.

8. The protective cover of claim 1, the cover panel insert comprising one of a closed cell foam, a rubber, a gel, or an inflatable bladder.

9. The protective cover of claim 1, at least one of the cover panels further comprising an upper surface, a lower surface and a plurality of magnets disposed adjacent the lower surface.

* * * * *